US012638466B2

(12) United States Patent
Muramatsu et al.

(10) Patent No.: US 12,638,466 B2
(45) Date of Patent: May 26, 2026

(54) AUTOMATIC ANALYZER

(71) Applicant: Hitachi High-Tech Corporation, Tokyo (JP)

(72) Inventors: Yoshiki Muramatsu, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1323 days.

(21) Appl. No.: 17/272,675

(22) PCT Filed: Sep. 5, 2019

(86) PCT No.: PCT/JP2019/034915
§ 371 (c)(1),
(2) Date: Mar. 2, 2021

(87) PCT Pub. No.: WO2020/066523
PCT Pub. Date: Apr. 2, 2020

(65) Prior Publication Data
US 2021/0341506 A1 Nov. 4, 2021

(30) Foreign Application Priority Data
Sep. 25, 2018 (JP) ................................. 2018-178431

(51) Int. Cl.
*G01N 35/10* (2006.01)
*G01N 35/02* (2006.01)

(52) U.S. Cl.
CPC ....... *G01N 35/1016* (2013.01); *G01N 35/025* (2013.01); *G01N 35/109* (2013.01); *G01N 2035/1058* (2013.01)

(58) Field of Classification Search
None
See application file for complete search history.

(56) References Cited

U.S. PATENT DOCUMENTS 6,814,936 B1 * 11/2004 Enhorning ............ B01L 3/0275
73/864.11
2004/0266015 A1 12/2004 Favuzzi et al.
(Continued)

FOREIGN PATENT DOCUMENTS

JP 05-60770 A 3/1993
JP 06-241862 A 9/1994
(Continued)

OTHER PUBLICATIONS

Chinese Office Action received in corresponding Chinese Application No. 201980057544.2 dated Sep. 28, 2023.
(Continued)

*Primary Examiner* — Paul S Hyun
(74) *Attorney, Agent, or Firm* — MATTINGLY & MALUR, PC

(57) ABSTRACT

The automatic analyzer includes a probe exchangeably attached to an arm section of a dispensing mechanism, a tube which is connected to the probe and forms a dispensing channel, a syringe which is connected to the tube and discharges and/or aspirates system water contained in the dispensing channel, and a controller that causes the syringe to aspirate the system water from the dispensing channel such that the system water is removed from the probe before the probe is detached from the arm section.

10 Claims, 5 Drawing Sheets

(56)     References Cited

U.S. PATENT DOCUMENTS

| | | |
|---|---|---|
| 2007/0140916 A1 | 6/2007 | Spiss |
| 2009/0123336 A1* | 5/2009 | Yang ..................... B01L 3/5027 |
| | | 422/68.1 |
| 2011/0017238 A1* | 1/2011 | Kuroda ............. G01N 35/1004 |
| | | 134/166 C |
| 2012/0255378 A1 | 10/2012 | Tsukioka |
| 2016/0101423 A1* | 4/2016 | Smith ................... B08B 9/0323 |
| | | 134/169 R |
| 2016/0303556 A1 | 10/2016 | Kopp et al. |
| 2018/0185836 A1* | 7/2018 | Romer ................. B01L 3/0237 |
| 2021/0077992 A1* | 3/2021 | Ott ........................ B01L 3/0217 |

FOREIGN PATENT DOCUMENTS

| | | |
|---|---|---|
| JP | 10-10134 A | 1/1998 |
| JP | 2005-283246 A | 10/2005 |
| JP | 2008-298493 A | 12/2008 |
| JP | 2010-085098 A | 5/2010 |
| JP | 2012-220301 A | 11/2012 |
| JP | 2016-15922 A | 2/2016 |

OTHER PUBLICATIONS

International Search Report of PCT/JP2019/034915 dated Nov. 5, 2019.
International Preliminary Report on Patentability Chapter II dated Aug. 3, 2020, in Japanese language.

* cited by examiner

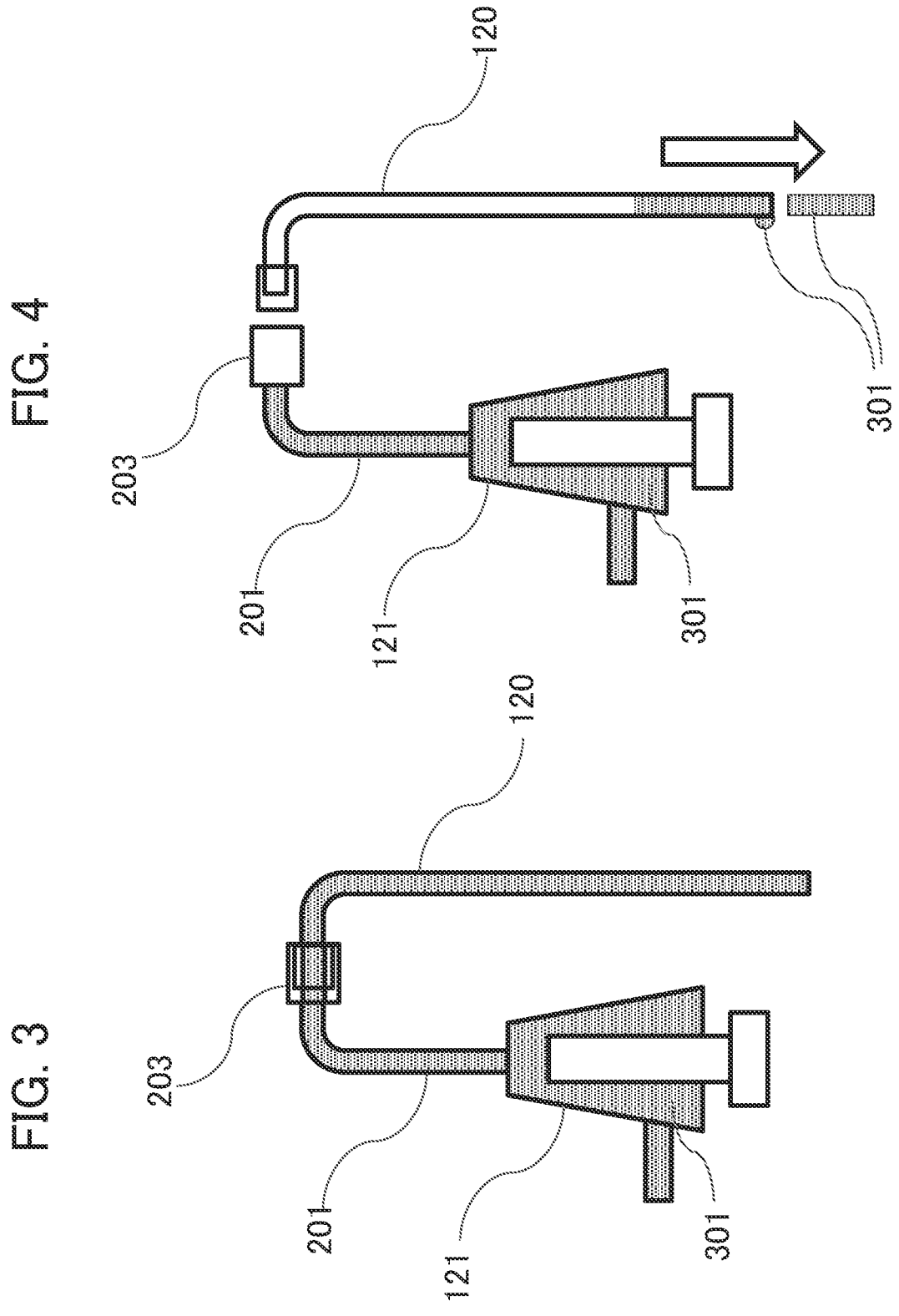

FIG. 5

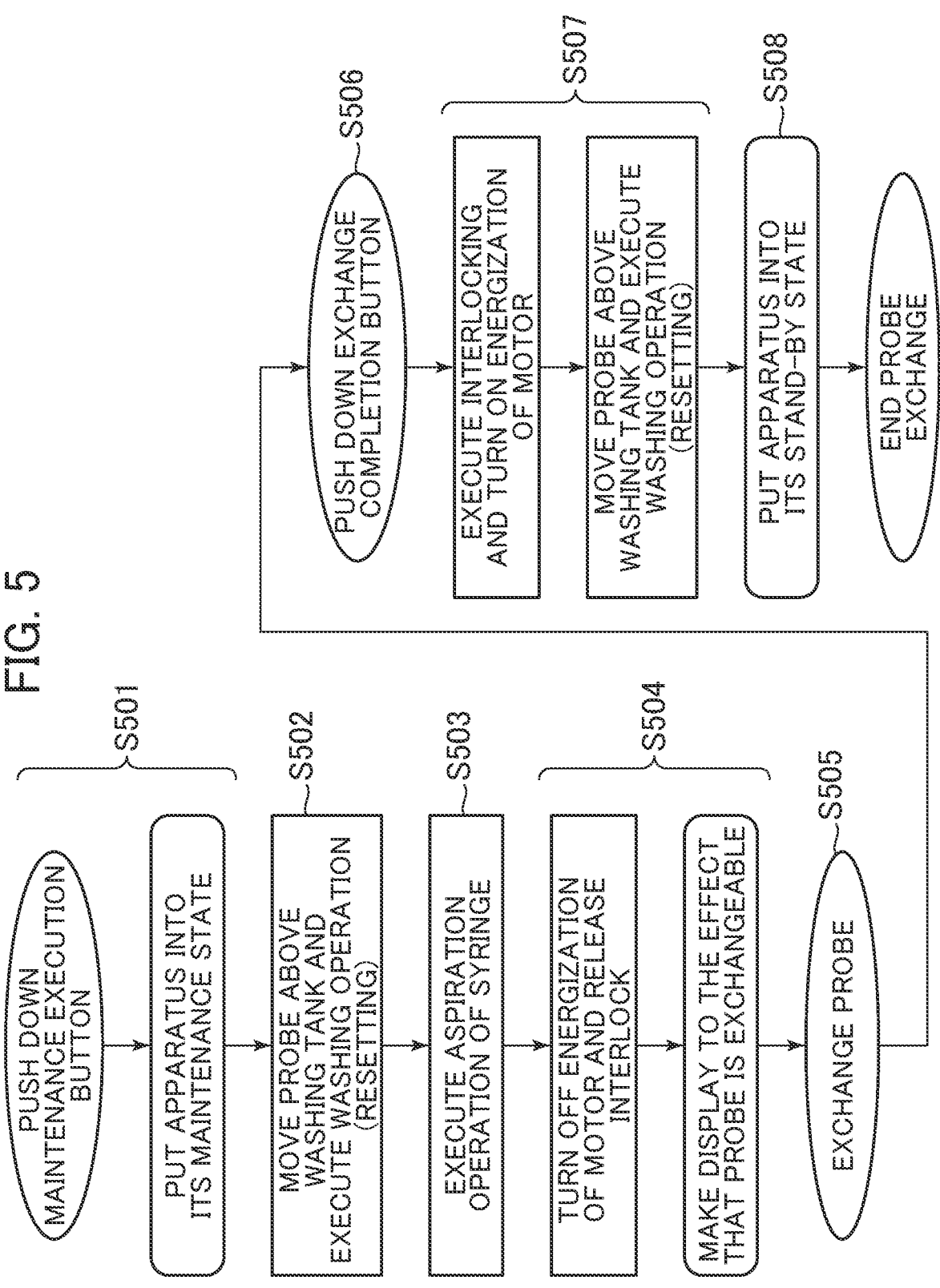

S501 — PUSH DOWN MAINTENANCE EXECUTION BUTTON

PUT APPARATUS INTO ITS MAINTENANCE STATE

S502 — MOVE PROBE ABOVE WASHING TANK AND EXECUTE WASHING OPERATION (RESETTING)

S503 — EXECUTE ASPIRATION OPERATION OF SYRINGE

S504 — TURN OFF ENERGIZATION OF MOTOR AND RELEASE INTERLOCK

MAKE DISPLAY TO THE EFFECT THAT PROBE IS EXCHANGEABLE

S505 — EXCHANGE PROBE

S506 — PUSH DOWN EXCHANGE COMPLETION BUTTON

S507 — EXECUTE INTERLOCKING AND TURN ON ENERGIZATION OF MOTOR

MOVE PROBE ABOVE WASHING TANK AND EXECUTE WASHING OPERATION (RESETTING)

S508 — PUT APPARATUS INTO ITS STAND-BY STATE

END PROBE EXCHANGE

AUTOMATIC ANALYZER

TECHNICAL FIELD

The present invention relates to an automatic analyzer provided with an exchangeable probe which dispenses a reagent and/or a sample.

BACKGROUND ART

An automatic analyzer, e.g. a biochemical automatic analyzer, performs the component analysis of biosamples such as urine and serum (hereinafter, referred to as a sample). For that purpose, it makes a sample and a reagent dispense in a reaction container for reaction employing a dispensing probe and optically measures the change in hue and turbidity caused in the reaction solution by means of photometers such as a spectrophotometer. Thus, e.g. the smudge and deformation of the probe give large influence on the dispensing precision and the reliability of the automatic analyzer.

As a result, it is necessary that the probe that cannot be used due to e.g. smudge and malfunction is exchanged (e.g. refer to the disclosure of Patent Literature 1). The probe to dispense a reagent and/or a sample is connected with the channel within the automatic analyzer by a nipple in order to make it exchangeable. Normally, the channel of the automatic analyzer is internally filled with a liquid (system water) which also applies to the interior of the probe. Thus, by removing the nipple with which the probe is connected with the channel for e.g. maintenance, the liquid contained in the probe might drop from the tip end of the probe. According to the conventional automatic analyzers, the countermeasures against such problem are limited to e.g. preparing in advance a receptacle to receive the liquid dropped from the tip end of the probe or arousing cautions to the uses through the manuals.

CITATION LIST

Patent Literature

[Patent Literature 1] Japanese Unexamined Patent Application Publication No. 2010-85098

SUMMARY OF THE INVENTION

Problem to be Solved by the Invention

Since the liquid remains within the probe after washing, the system water might attach on the tip end of the probe in the form of droplets when exchanging the probe so as to cause malfunctions in the mechanism of the automatic analyzer. By dispensing with the liquid dropped from the probe and the droplets attached on the tip end of the probe when exchanging the probe, an automatic analyzer excellent in maintenance and reliability is provided.

Means for Solving the Problems

The automatic analyzer according to one embodiment of the present invention includes a probe exchangeably attached to an arm section of a dispensing mechanism; a tube which is connected to the probe and forms a dispensing channel; a syringe which is connected to the tube and discharges or aspirates the system water within the dispensing channel; and a controller, in which the controller makes the syringe aspirate the system water from the dispensing channel such that the system water is removed from the probe before the probe is detached from the arm section.

Effect of the Invention

By dispensing with the liquid dropping from and the droplets being attached on the tip end of the probe when exchanging the dispensing probe, an automatic analyzer excellent in maintenance and reliability is provided.

The other technical problems and their solution as well as the novel features of the present invention are elaborated in the detailed description of the invention with reference to the accompanying drawings.

BRIEF DESCRIPTION OF THE DRAWINGS

FIG. 3 is a view illustrating the state of the dispensing channel before the reagent probe is exchanged according to the prior art.

FIG. 4 is a view showing that the system water drops from the tip end of the reagent probe and the droplets attach on the tip end.

FIG. 5 is a flow chart when exchanging the reagent probe.

MODE FOR CARRYING OUT THE INVENTION

The preferred embodiment for carrying out the invention is described in detail with reference to the accompanying drawings.

Figure 1:
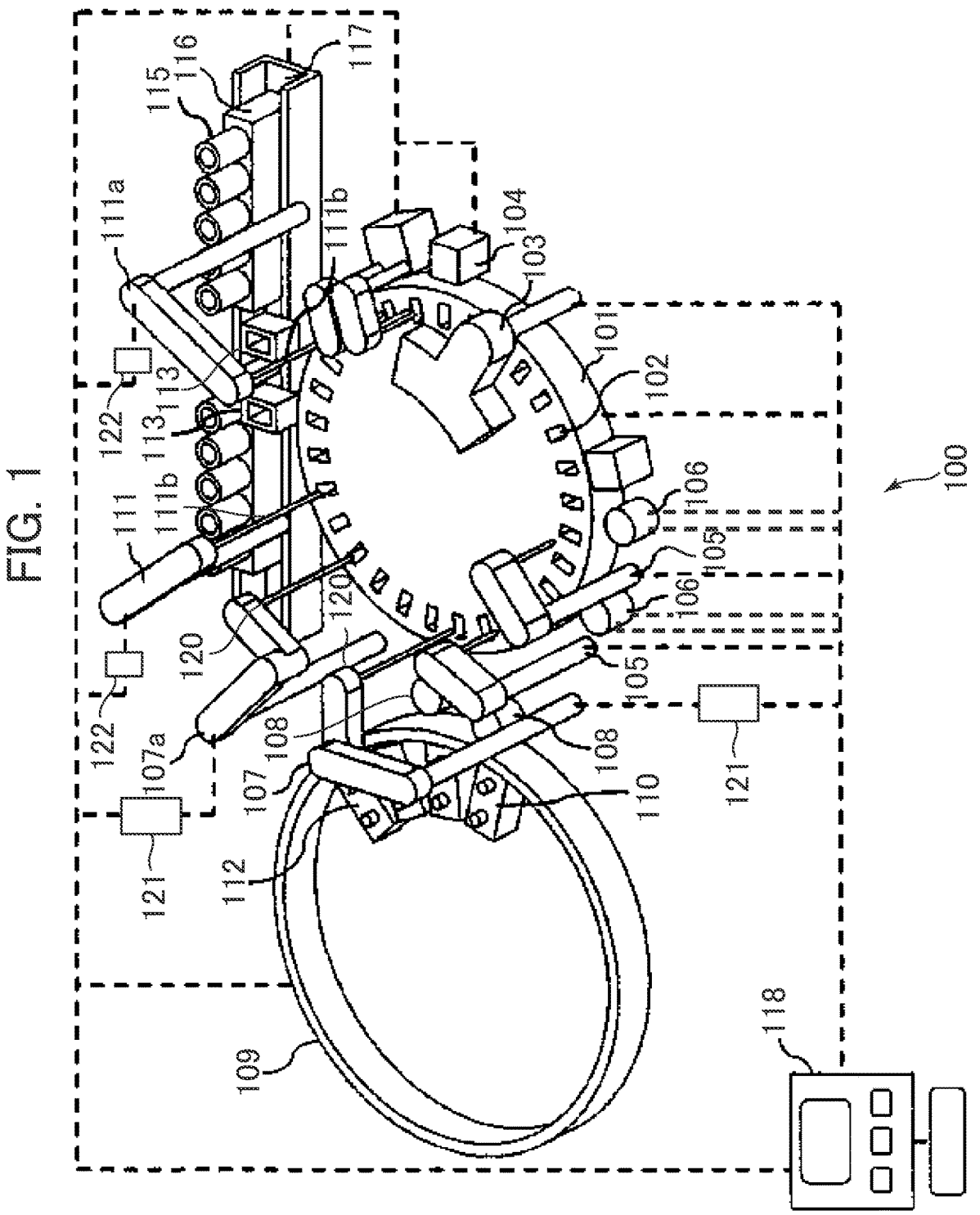
FIG. 1 is a schematic view illustrating the structural arrangement of the automatic analyzer.

FIG. 1 is a schematic view illustrating the structural arrangement of the automatic analyzer. The automatic analyzer 100 is intended for measuring the reaction solution subjected to chemical reaction within a reaction container 102 so as to perform its component analysis and essentially includes a reaction disk 101; a washing mechanism 103; a spectrophotometer 104; a stirring mechanism 105; a washing tank 106; a first reagent dispensing mechanism 107; a second reagent dispensing mechanism 107a; a washing tank 108; a reagent disk 109; a first sample dispensing mechanism 111; a second sample dispensing mechanism 111a; a washing tank 113; a sample transport mechanism 117; and a controller 118.

The reaction containers 102 are circumferentially disposed in the reaction disk 101. The reaction containers 102 are intended for receiving a mixed solution in which a sample is admixed with a reagent and plurally juxtaposed around the reaction disk 101. The sample transport mechanism 117 which transports a sample rack 116 on which sample containers 115 are carried is disposed in the vicinity of the reaction disk 101.

The first sample dispensing mechanism 111 and the second sample dispensing mechanism 111a which are respectively rotatable and vertically movable are disposed between the reaction disk 101 and the sample transport mechanism 117 and are respectively provided with a sample probe 111b. A sample syringe 122 is connected to the sample probes 111b respectively. The sample probes 111b move horizontally and arcuately around a rotational axis and vertically moves so as to dispense a sample from the sample containers 115 to the reaction containers 102.

The reagent disk 109 is a storage which allows e.g. a plurality of reagent bottles 110 in which reagents are received and a plurality of detergent bottles 112 to be circumferentially carried therein. The reagent disk 109 is refrigerated.

The first reagent dispensing mechanism 107 and the second reagent dispensing mechanism 107*a* which are rotatable and vertically movable are disposed between the reaction disk 101 and the reagent disk 109 and are respectively provided with a reagent probe 120. The reagent dispensing mechanism 107 and the reagent dispensing mechanism 107*a* make the reagent probe 120 move vertically and horizontally. A reagent syringe 121 is connected to the reagent probes 120 respectively. Through such reagent syringes 121 via the reagent probes 120, e.g. the reagents, detergents, diluted solutions and pre-treatment reagents aspirated from e.g. the reagent bottles 110, the detergent bottles 112, the diluted solution bottles and the pre-treatment reagent bottles are dispensed to the reaction containers 102.

The washing mechanism 103 to wash the interior of the reaction containers 102; the spectrophotometer 104 for measuring the absorbance of the light passed through the mixed solution within the reaction containers 102; the stirring mechanism 105 for admixing a sample and a reagent dispensed to the reaction containers 102 and the like are disposed in the circumference of the reaction disk 101.

Further, the washing tank 108 for the reagent probe 120 is disposed within the moving range of the first reagent dispensing mechanism 107 and the second reagent dispensing mechanism 107*a* respectively; the washing tank 113 for the sample probe 111*b* is disposed within the moving range of the first sample dispensing mechanism 111 and the second sample dispensing mechanism 111*a* respectively; and the washing tank 106 for the stirring mechanism 105 is disposed within the moving range of the stirring mechanism 105.

The respective mechanisms above are connected to the controller 118, so that their operations are controlled by the controller 118. The controller 118 is composed of e.g. a computer and controls the operations of the respective mechanisms above within the automatic analyzer as well as performs the computing operation to calculate the concentrations of the prescribed components of such liquid samples as blood and urine.

Figure 2:
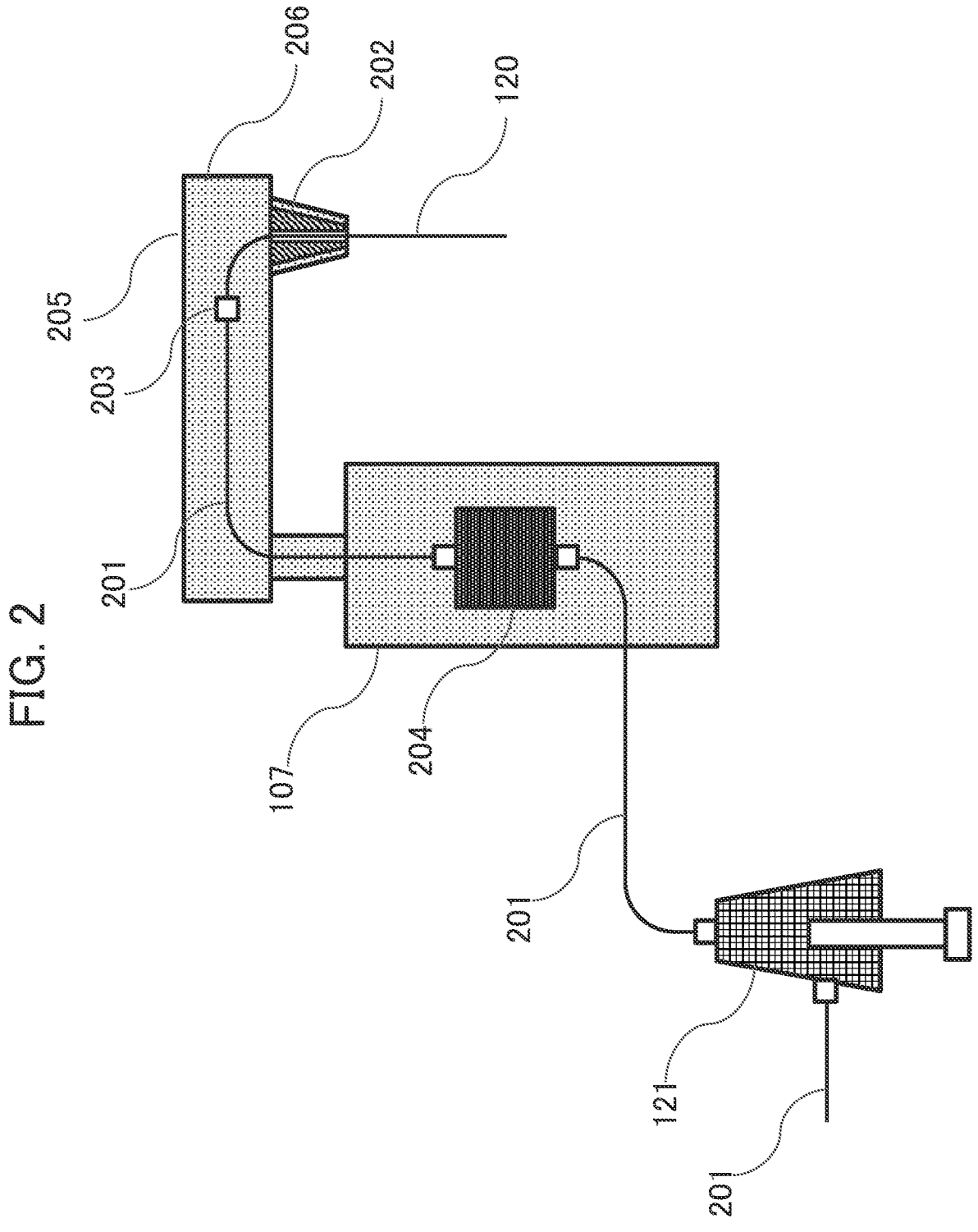
FIG. 2 is a view illustrating the structural arrangement of the reagent dispensing mechanism.

Then, the details of the dispensing operations of the dispensing mechanisms are explained with reference to FIG. 2. The reagent dispensing mechanisms and the sample dispensing mechanisms are the same in structure. In FIG. 2, the structure of the reagent dispensing mechanism 107 is illustrated with its relevant channel included.

The arm section 206 of the reagent dispensing mechanism 107 is provided with a probe guide 202 to fix the position of the reagent probe 120 attached to the reagent dispensing mechanism 107. When exchanging the probe, as the upper face of the arm section 206 is provided with a top cover 205, the probe to be exchanged is pulled out of the probe guide 202 and a new probe is inserted into the probe guide 202 with the top cover 205 opened. The reagent probe 120 is fixed to the position defined by the probe guide 202. The channel of the dispensing mechanism is formed by the reagent probe 120 being interconnected with a tube 201 and a nipple 203. To note, the probe corresponds to the portion of the dispensing channel which is exchangeably attached to the tube 201, so that it may not be integrally formed from its tip end with the tube. The reagent probe 120 is connected through the tube 201 constituting the dispensing channel to the reagent syringe 121, and a pressure sensor 204 is further provided in the running course of the dispensing channel.

During the normal operation, the dispensing channel is internally filled with the system water (pure water) 301, and the aspiration or discharge of the reagent is carried out with the reagent syringe 121 operated so as to make the system water contained in the dispensing channel discharge or aspirate. Thus, conventionally, when exchanging the reagent probe as well, as illustrated in FIG. 3, the dispensing channel including the reagent probe 120 is internally filled with the system water 301 over the connection portion (the position of the nipple 203) between the reagent probe 120 and the tube 201 up to the side of the reagent probe.

In this state, the condition where the nipple 203 interconnecting the reagent probe 120 and the tube 201 along the dispensing channel is slackened in order to exchange the reagent probe 120 is illustrated in FIG. 4. By the connection portion being liberated, it causes the system water 301 contained in the reagent probe 120 to flow under its self-weight, which leads to the liquid dropping from the tip end of the reagent probe 120 or the droplets attaching on the tip end of the probe. Especially, the droplets attached on the tip end of the probe might cause malfunctions in the mechanism.

One of such malfunctions is exemplified herein. Generally speaking, the probe is provided with a liquid surface detection mechanism to automatically detect the liquid surface and automatically control the vertical movement of the dispensing mechanism when dispensing the reagent. The liquid surface detection mechanism is configured to detect the liquid surface by detecting a difference in electrostatic capacitance between the probe 120 and the probe guide 202 (defined as a reference potential) which arises when the probe makes into contact with the liquid. However, when the probe is pulled out of the probe guide 202 in the state where the droplets of the system water attach on the tip end of the probe, such droplets attach on the inner side of the probe guide 202, and inserting a new probe into the probe guide 202 in this state causes the probe 120 and the probe guide 202 to be short-circuited, which invites the malfunction of the liquid surface detection mechanism.

In order to prevent such malfunction, covering the inner side of the probe guide 202 with an insulator makes it possible to maintain the insulation between the probe 120 and the probe guide 202 even when the probe is pulled out of the probe guide in the state where the droplets are attached on the probe. However, since the tolerance between the probe 120 and the probe guide 202 is made extremely small in order to prevent the probe 120 from fluctuating, complicating the structure of the probe guide 202 leads to increasing the production cost. The present example prevents the system water from dropping from the tip end of the probe and the droplets from attaching on the tip end when exchanging the probe in a simplified manner, thereby, keeping the abovementioned inconveniences from happening.

FIG. 5 illustrates a flow chart when exchanging the reagent probe 120 according to the present example. To begin with, a maintenance execution button is pushed down to enable the exchange of the reagent probe 120 through a manipulation section of the controller 118 so as to put the automatic analyzer into its maintenance state (at S501). The controller 118 makes the reagent dispensing mechanism 107 operate so as to make the reagent probe 120 move to the washing tank 108 for washing the reagent probe 120 (resetting operation at S502). During the washing operation, the interior and exterior of the reagent probe 120 are washed. The probe is internally washed by the system water being discharged from its interior. The water by which the exterior of the probe is washed and the system water which is discharged from the interior of the probe are subjected to vacuum suction for removal. The plunger disposed in the reagent syringe 121 ends its resetting operation in the state where it has discharged the system water due to washing the interior of the probe. In other words, the aspiration operation of the reagent syringe 121 is executed after the washing (at S503). As with the aspiration operation of the reagent syringe 121 referred to herein, it is necessary that the aspiration volume by which the system water 301 left over on the side of the reagent probe 120 with respect to the nipple 203 is replaced with the air be enabled. Then, the controller turns off the energization of the motor of the dispensing mechanism in order to move the dispensing mechanism to a position to facilitate the probe to be exchanged; releases the interlock of the top cover 205; and makes a display on the manipulation section to the effect that the reagent probe 120 is exchangeable (at S504). After checking such display, the user opens the top cover 205 and carries out the exchange of the reagent probe 120 (at S505). After finishing exchanging the probe, the user closes the top cover 205 and pushes down a reagent probe 120 exchange completion button through the manipulation section (at S506). The controller 118 turns on the energization of the motor of the dispensing mechanism and executes the interlocking of the top cover 205. Thereafter, the controller makes the reagent dispensing mechanism 107 operate so as to make the reagent probe 120 move to the washing tank 108 for washing the reagent probe 120 (resetting operation at S507). Since the plunger of the syringe performs the aspiration operation when exchanging the probe, it facilitates the discharging operation of the system water during the washing operation to be executed. Thereafter, the controller 118 puts the automatic analyzer into its stand-by state (at S508), thereby, the subsequent operations (such as measurement and maintenance) being executable.

Figures 6, 7:
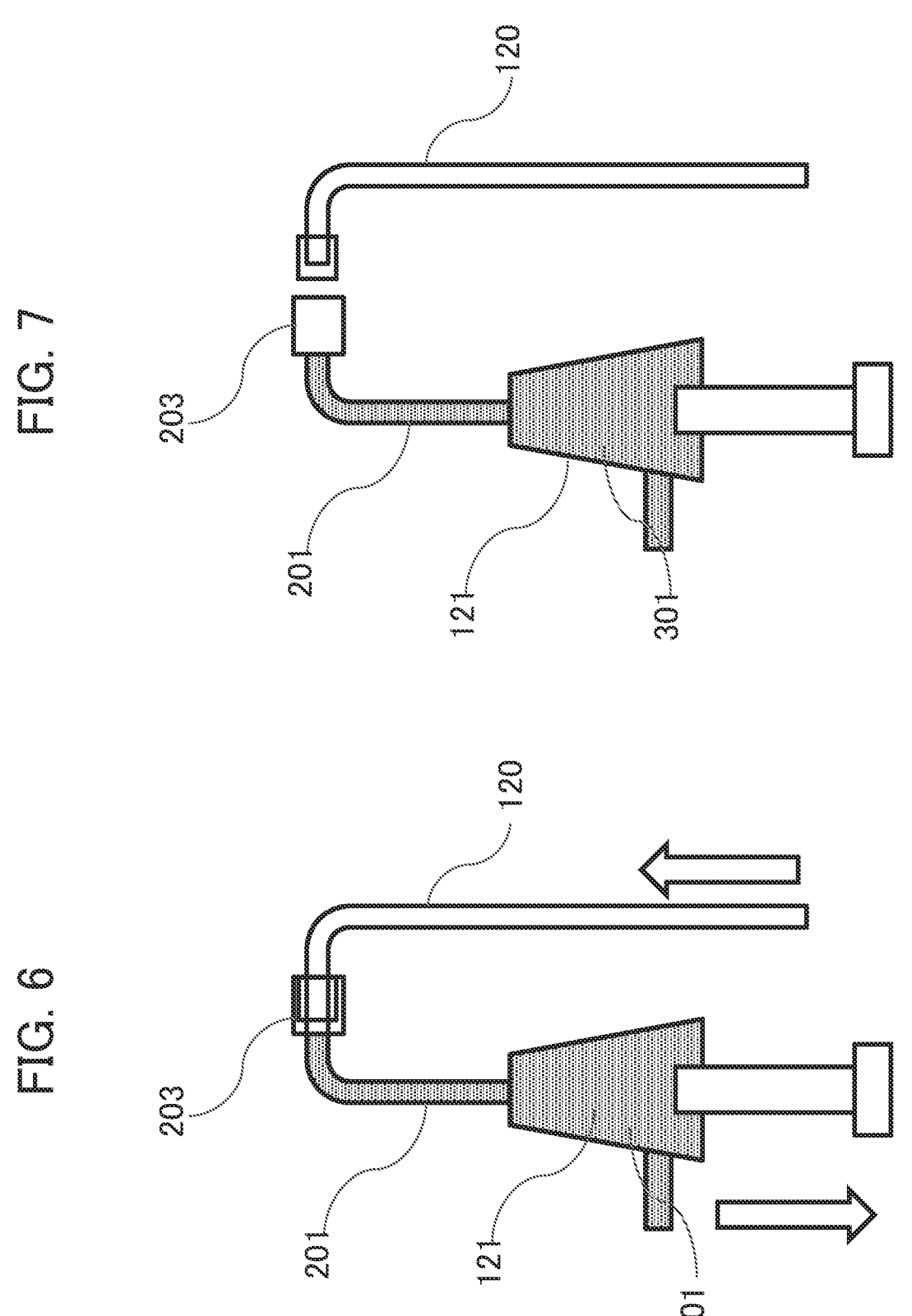
FIG. 6 is a view illustrating the state where the reagent probe is exchanged according to the present example.
FIG. 7 is a view illustrating the state where the reagent probe is exchanged according to the present example.

Performing the aspiration operation of the reagent syringe 121 at the step S503 results in making the reagent probe 120 aspirate the air, so that the system water 301 contained in the reagent probe 120 is replaced with the air as illustrated in FIG. 6, which invites the state where there is no presence of the system water 301 ahead of the connection portion (nipple 203) (on the side of the reagent probe with respect to the connection portion). Thus, as illustrated in FIG. 7, it dispenses with the liquid dropping from the tip end of the reagent probe 120 and/or the droplets attaching on the tip end even when the nipple 203 is slackened.

In this way, dispensing with the liquid dropping from the tip end of the dispensing probe and/or the droplets attaching on the tip end when exchanging the dispensing probe prevents the mechanisms of the automatic analyzer from causing malfunctions.

It should be noted that the present invention is not limited to the above embodiment, and may be modified into various manners or developed in various modes. The above detailed embodiment is only intended for facilitating the persons skilled in the art to understand the present invention, in which the present invention is not necessary limited to any particular embodiment incorporating the entire features noted herein. For instance, the case where the reagent probe 120 is exchanged is exemplified, but the same exchanging steps above are also applicable to the sample probe 111b.

Further, the case where the syringe is adopted for the actuator to aspirate the water system contained in the probe is exemplified, but an air cylinder or a pump is also adoptable for that purpose.

DESCRIPTION OF THE REFERENCE NUMERALS AND SIGNS

100: automatic analyzer
101: reaction disk
102: reaction container
103: washing mechanism
104: spectrophotometer
105: stirring mechanism
106: washing tank (for stirring mechanism)
107, 107a: reagent dispensing mechanism
108: washing tank (for reagent dispensing mechanism)
109: reagent disk
110: reagent bottle
111, 111a: sample dispensing mechanism
111b: sample probe
112: detergent bottle
113: washing tank (for sample dispensing mechanism)
115: sample container
116: sample rack
117: sample transport mechanism
118: controller
120: reagent probe
121: reagent syringe
122: sample syringe
201: tube
202: probe guide
203: nipple
204: pressure sensor
205: top cover
206: arm section
301: system water

The invention claimed is:

1. An automatic analyzer comprising:
a dispensing mechanism comprising an arm section;
a probe, having a tip end, exchangeably attached to the arm section of the dispensing mechanism;
a tube which is connected to the probe at a connection portion and forms a dispensing channel;
a syringe which is connected to the tube and discharges and/or aspirates system water contained in the dispensing channel; and
a controller,
wherein the controller is configured to cause the syringe to aspirate the system water from the dispensing channel such that the system water is removed from the probe and replaced with air aspirated through the tip end of the probe before a connection at the connection portion between the probe and the tube is liberated, and
wherein the connection portion through which the system water flows is positioned at a different end from the tip end through which the air is aspirated.

2. The automatic analyzer according to claim 1,
wherein the arm section is provided with a probe guide and the probe is inserted into the probe guide when the probe is attached to the arm section.

3. The automatic analyzer according to claim 2, further comprising:
a liquid surface detection mechanism,
wherein the liquid surface detection mechanism is configured to detect a change in electrostatic capacitance between the probe guide defined as a reference potential and the probe.

4. The automatic analyzer according to claim 1, further comprising:

a washing tank;

wherein the controller is configured to execute a washing operation to wash the probe in the washing tank before the probe is exchanged.

5. The automatic analyzer according to claim 1, further comprising:

a washing tank;

wherein the controller is configured to execute a washing operation to wash the probe in the washing tank after the probe is exchanged.

6. The automatic analyzer according to claim 1, wherein the probe aspirates a reagent and/or a sample and discharges the aspirated reagent and/or sample into reaction containers.

7. The automatic analyzer according to claim 1, wherein the probe is connected to the tube through a nipple.

8. The automatic analyzer according to claim 1, wherein the controller is configured to cause the syringe to discharge the system water from the probe for washing an interior of the probe before the probe is exchanged and cause the syringe to aspirate the system water from the dispensing channel such that the system water remaining in the probe is replaced with air.

9. The automatic analyzer according to claim 1, wherein in response to pushing a maintenance execution button to enable exchange of the probe through a manipulation section of the controller, the controller is configured to cause the syringe to aspirate the system water from the dispensing channel.

10. The automatic analyzer according to claim 1, wherein the system water is aspirated from the dispensing channel such that the system water is aspirated beyond the connection portion and the probe is filled with air.

* * * * *